United States Patent
Seok et al.

(10) Patent No.: US 11,595,884 B2
(45) Date of Patent: Feb. 28, 2023

(54) APPARATUS AND METHODS FOR EHT MULTI-LINK BBS PARAMETER UPDATE

(71) Applicant: MediaTek Singapore Pte. Ltd., Singapore (SG)

(72) Inventors: Yongho Seok, San Jose, CA (US); Kai Ying Lu, San Jose, CA (US); James Chih-Shi Yee, San Jose, CA (US)

(73) Assignee: MEDIATEK SINGAPORE PTE. LTD., Singapore (SG)

(*) Notice: Subject to any disclaimer, the term of this patent is extended or adjusted under 35 U.S.C. 154(b) by 32 days.

(21) Appl. No.: 17/166,856

(22) Filed: Feb. 3, 2021

(65) Prior Publication Data
US 2021/0250848 A1 Aug. 12, 2021

Related U.S. Application Data

(60) Provisional application No. 62/975,342, filed on Feb. 12, 2020.

(51) Int. Cl.
*H04W 48/16* (2009.01)
*H04W 36/06* (2009.01)
*H04W 40/24* (2009.01)
*H04W 56/00* (2009.01)

(52) U.S. Cl.
CPC .......... *H04W 48/16* (2013.01); *H04W 36/06* (2013.01); *H04W 40/244* (2013.01); *H04W 56/001* (2013.01)

(58) Field of Classification Search
CPC ... H04W 48/16; H04W 36/06; H04W 40/244; H04W 56/001; H04W 48/12; H04W 84/12
See application file for complete search history.

(56) References Cited

U.S. PATENT DOCUMENTS

| | | | |
|---|---|---|---|
| 2015/0245282 A1* | 8/2015 | Kim | H04W 48/20 370/338 |
| 2018/0270038 A1 | 9/2018 | Oteri et al. | |
| 2019/0053302 A1* | 2/2019 | Bang | H04W 8/005 |
| 2019/0268956 A1 | 8/2019 | Xiao et al. | |
| 2021/0014911 A1* | 1/2021 | Patil | H04W 48/08 |

FOREIGN PATENT DOCUMENTS

| | | |
|---|---|---|
| WO | 2018144156 A2 | 8/2018 |
| WO | 2021011427 A1 | 1/2021 |

OTHER PUBLICATIONS

Multi-Link BSS Parameter Update Name Affiliations Address Phone Email 14 pp. doc.: IEEE 802.11-20/0337r0; Jan. 2020.

* cited by examiner

*Primary Examiner* — Eric Myers

(57) ABSTRACT

Embodiments of the present invention provide apparatus and methods for announcing a BSS parameter updates for a wireless link that can be received by a MLD even when the MLD is not listening for parameter updates on that specific link by employing a different wireless link to broadcast, receive, and/or signal the BSS parameter update. An MLD can update the BSS parameters of the wireless link and use the wireless link according to the updated BSS parameters (e.g., after performing a channel switch). According to some embodiments, an STA within an AP MLD transmits an information elements (IE) including BSS parameter updates associated with a different STA (operating on a different wireless link) within the AP MLD.

20 Claims, 8 Drawing Sheets

| Element ID | Length | Element ID Extension | Link ID | Optional Subelements |
|---|---|---|---|---|
| 1 octet | 1 octet | 1 octet | 1 octet | variable |

FIG. 1

APPARATUS AND METHODS FOR EHT MULTI-LINK BBS PARAMETER UPDATE

CROSS-REFERENCE TO RELATED APPLICATIONS

This application claims the benefit of and priority to provisional patent application Ser. No. 62/975,342, with filing date Feb. 12, 2020, which is hereby incorporated by reference in its entirety.

FIELD

Embodiments of the present invention generally relate to the field of wireless communications. More specifically, embodiments of the present invention relate to systems and methods for updating operating parameters in a wireless network.

BACKGROUND

Modern electronic devices typically send and receive data with other electronic devices wirelessly using Wi-Fi, and many of these devices are "dual band" or multi-link devices (MLD) that include at least two wireless transceivers capable of operating in different frequency bands, e.g., 2.4 GHz, 5 GHz, and 6 GHz. In most cases, a wireless device will communicate over only a single band at a time. For example, older and low-power devices, e.g., battery powered devices, often operate on the 2.4 GHz band. Newer devices and devices that require greater bandwidth often operate on the 5 GHz band. The availability of the 6 GHz band is a recent advancement and can provide higher performance, lower latency, and faster data rates.

In some cases, the use of a single band may not satisfy the bandwidth needs of certain devices. Therefore, some developing approaches to wireless communication increase communication bandwidth by operating on multiple bands concurrently (technically called link aggregation or multi-link operation). Multi-link operations can provide higher network throughput and improved network flexibility compared to traditional techniques for wireless communication.

In most cases, a non-AP MLD will not enable all links at a given time to conserve power unless traffic requirements are relatively high. A non-AP MLD may operate on different channels depending on channel conditions, such as traffic, channel capabilities, bandwidth, etc., and may switch between the channels as necessary. An MLD can monitor the different links and perform basic operations, such as traffic indication and BSS parameter updates.

For these reasons, while a non-AP MLD may be associated with a wireless AP over multiple links, at a given time, the non-AP MLD however may only be actively listening for parameter updates on a single link. For example, the non-AP MLD may only have a single link enabled that is monitored for updates and used to perform basic operations while other links are in a reduced power or doze state. When a BSS parameter update is transmitted on one of these links, the non-AP MLD may not receive the parameter update and may not be able to use the wireless link associated with the parameter update, which is problematic.

SUMMARY

Accordingly, embodiments of the present invention are drawn to methods for announcing and providing BSS parameter updates for a wireless link that can be received by a MLD even if the MLD is not listening for parameter updates on that specific link by using a different wireless link to broadcast/receive the BSS parameter update. An MLD can advantageously update the BSS parameters of the wireless link and use the wireless link after the BSS parameter update (e.g., after performing a channel switch). According to some embodiments, an STA within an AP MLD transmits an information elements (IE) including BSS parameter updates associated with a different STA (operating on a different wireless link) within the AP MLD.

According to one described embodiments, a method of transmitting data over a wireless network is disclosed. The method includes, at a first wireless station (STA) of an access point (AP) multi-link device (MLD), wirelessly transmitting a beacon frame to a first STA of a non-AP MLD over a first wireless link of the wireless network, where a second wireless link of the wireless network carries communication between a second STA of the non-AP MLD and a second STA of the AP MLD, and where the beacon frame includes an indication of a basic service set (BSS) parameter update, and an identification of the second wireless link, and at the second STA of the AP MLD, wirelessly communicating with the second STA of the non-AP MLD over the second wireless link according to the BSS parameter update.

According to some embodiments, the BSS parameter updated is carried in an Extended Channel Switch Announcement (ECSA) information element (IE) of a multi-link information IE.

According to some embodiments, the BSS parameter update includes a beacon interval, and a timing synchronization function (TSF) offset between the first wireless link and the second wireless link for performing a channel switch on the second wireless link.

According to some embodiments, the BSS parameter update includes a new channel number, and a channel switch count for performing a channel switch on the second wireless link.

According to some embodiments, the second STA of the non-AP MLD is operable to stop transmitting over the second wireless link until a beacon frame including an Extended Channel Switch Announcement (ECSA) information element (IE) having a Channel Switch Count set to 0 is received by the second STA of the non-AP MLD.

According to some embodiments, the BSS parameter update includes a BSS color change, and the method further includes disabling a BSS color of the wireless network until the BSS color change is complete.

According to some embodiments, the BSS parameter update includes a change sequence number, where a change in a value of the change sequence number indicates a critical update for the second wireless link.

According to some embodiments, the critical update includes at least one of an Extended Channel Switch Announcement (ECSA), a BSS Color Change Announcement, an Enhanced Distributed Channel Access (EDCA) parameter modification, a multi-user (MU) EDCA Parameter Set element, and a Modification of a Spatial Reuse Parameter Set element.

According to some embodiments, the BSS parameter update includes a change sequence number, where a change in a value of the change sequence number causes the second STA of the non-MLD to enter an awake state.

According to another embodiment, a method of transmitting data over a wireless network is disclosed. The method includes, at a first wireless station (STA) of an non-access point (AP) multi-link device (MLD), accessing a beacon frame transmitted by a first STA of an AP MLD, where the first STA of the non-AP MLD and first STA of the AP MLD communicate wirelessly over a first wireless link, where a second wireless link carries communication between a second STA of the non-AP MLD and a second STA of the AP MLD, and where the beacon frame includes an indication of a BSS parameter update and an identification of the second wireless link, and at the second STA of the non-AP MLD, wirelessly communicating with the second STA of the AP MLD over the second wireless link according to the BSS parameter update.

According to some embodiments, the BSS parameter updated is carried in an Extended Channel Switch Announcement (ECSA) information element (IE) of a multi-link information IE.

According to some embodiments, the BSS parameter update includes a beacon interval, and a timing synchronization function (TSF) offset between the first wireless link and the second wireless link for performing a channel switch on the second wireless link.

According to some embodiments, the BSS parameter update includes a new channel number, and a channel switch count for performing a channel switch on the second wireless link.

According to some embodiments, the second STA of the non-AP MLD is operable to stop transmitting over the second wireless link until a beacon frame including an Extended Channel Switch Announcement (ECSA) information element (IE) having a Channel Switch Count set to 0 is received by the second STA of the non-AP MLD.

According to some embodiments, the BSS parameter update includes a BSS color change, and further including disabling a BSS color of the wireless network until the BSS color change is complete.

According to some embodiments, the BSS parameter update includes a change sequence number, where a change in a value of the change sequence number indicates a critical update for the second wireless link.

According to some embodiments, the critical update includes at least one of an Extended Channel Switch Announcement (ECSA), a BSS Color Change Announcement, an EDCA parameter modification, a multi-user (MU) EDCA Parameter Set element, and a Modification of a Spatial Reuse Parameter Set element.

According to some embodiments, the BSS parameter update includes a change sequence number, where a change in a value of the change sequence number causes the second STA of the non-MLD to enter an awake state.

According to a different embodiment, an access point (AP) multi-link device (MLD) for transmitting data over a wireless network is disclosed. The AP MLD includes a first transceiver and a second transceiver configured to send and receive data over the wireless network, a memory for storing data, and a processor operable to wirelessly transmit a beacon frame to a first STA of a non-AP MLD over a first wireless link of the wireless network using the first transceiver, where a second STA of the non-AP MLD and a second STA of the AP MLD communicate wirelessly over a second wireless link of the wireless network using the second transceiver, and where the beacon frame includes an indication of a BSS parameter update, and an identification of the second wireless link, and to wirelessly communicate with the second STA of the non-AP MLD over the second wireless link using the second transceiver according to the BSS parameter update.

According to some embodiments, the BSS parameter update is carried in a management frame.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 is a block diagram of an exemplary Multi-link IE for transmitting and/or announcing a BSS parameter update for a multi-link device according to embodiments of the present invention.

DETAILED DESCRIPTION

Figure 2:
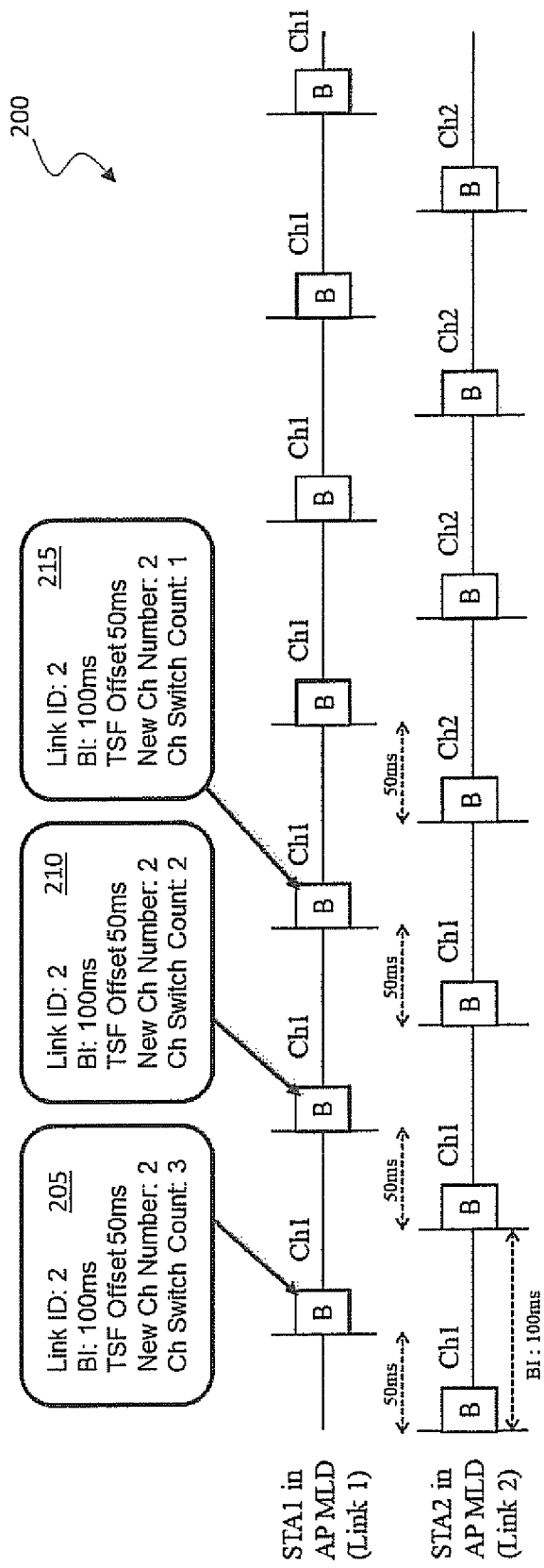
FIG. 2 is a transmission timing diagram depicting exemplary wireless transmissions of STAs of an AP MLD operating on exemplary wireless links Link 1 and Link 2 for announcing/transmitting a BSS parameter update for Link 2 by transmitting data over Link 1 according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follow are presented and discussed in terms of a method. Although steps and sequencing thereof are disclosed in a figure herein (e.g., FIGS. 6-7) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic announces capable of being stored, transferred, combined, compared, and otherwise manipulated in a computer system. It has proven convenient at times, principally for reasons of common usage, to refer to these announces as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "configuring," "setting," "storing," "transmitting," "retransmitting," "authenticating," "identifying," "requesting," "reporting," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

NOVEL TECHNIQUES FOR EHT MULTI-LINK BSS PARAMETER UPDATE

As used herein, the term "EHT" refers generally to a recent generation of wireless communication (Wi-Fi) known as Extremely High Throughput (EHT) and is defined according to the IEEE 802.11be standards. The term station (STA) refers generally to an electronic device capable of sending and receiving data over Wi-Fi. A multi-link device (MLD), such as an AP MLD or a non-AP MLD, can include several wireless access point/non-access point stations for communicating over different wireless links and/or for performing multi-link operations.

Embodiments of the present invention are drawn to methods and apparatus for announcing a BSS parameter updates for a wireless link that can be received by a MLD even when the MLD is not listening for parameter updates on that specific link by advantageously employing a different wireless link to broadcast, receive, and/or signal the BSS parameter update. An MLD can update the BSS parameters of the wireless link and use the wireless link according to the updated BSS parameters (e.g., after a channel switch). According to some embodiments, an STA within an AP MLD transmits an information elements (IE) including BSS parameter updates associated with a different STA (operating on a different wireless link) within the AP MLD.

With regard to FIG. 1, an exemplary Multi-link IE 100 encapsulating BSS parameters (e.g., information elements) for configuring a different wireless link (a wireless link other than the link used by the wireless STA to transmit the IE) is depicted according to embodiments of the present invention. The optional subelements field 105 in the Multi-link IE contains an Extended Channel Switch Announcement (ECSA) IE. When a non-AP MLD does not monitor an associated wireless link, the non-AP MLD may fail to receive or track a target beacon transmission time (TBTT) on that link and the TBTT that indicates when the link will switch to a different channel. Further, the TBTT references the channel switch time (e.g., in a Channel Switch Count field), and the optional subelements field 105 in Multi-link IE 100 can contain the beacon interval (BI) and the timing synchronization function (TSF) offset between two links in order to track the TBTT. In this way, the non-AP MLD can successfully communicate with the AP MLD after the channel switch according to the BI and TSF offset.

FIG. 2 depicts exemplary wireless transmissions of STAs of an AP MLD operating on exemplary wireless links Link 1 and Link 2 according to embodiments of the present invention. In the example of FIG. 2, exemplary STAs (e.g., STA1 and STA2) of the AP MLD broadcast beacon frames over Channel 1 using Link 1. Beacon frame 205 broadcast by STA1 over Channel 1 includes a Multi-link IE indicating: Link ID=Link 2; beacon interval (BI)=100 ms; TSF offset=50 ms; new channel number=Channel 2; and Channel switch count=3. Beacon frame 210 is subsequently broadcast on Channel 1 using Link 1 by STA1 of the MLD AP and includes a decremented Channel switch count (Channel switch count=2). The final beacon frame 215 transmitted before the channel switch is broadcast over Channel 1 using Link 1 by STA1 of the MLD AP and includes a decremented Channel switch count (Channel switch count=1). In this example, after transmitting beacon frame 215, STA2 performs a channel switch to switch operating channels from Channel 1 to Channel 2 as indicated by beacon frames 205, 210, and 215. The beacon frames are received by a non-AP MLD that accesses the ECSA information related to the channel switch of STA2 encapsulated in the Multi-link IEs carried by the beacon frames. The non-AP MLD advantageously tracks the TBTT and can communicate with STA2 of the AP MLD over Link 2 using Channel 2 after STA2 of the AP MLD switches to Channel 2.

According to some embodiments, the Channel Switch Mode field in the ECSA IE (of a Multi-link IE) is set to 1 to force a non-AP MLD associated with the AP MLD to stop transmitting on the link that will switch channels until the channel switch takes place. If a non-Directional Multi-Gigabit (DMG) STA that is not an independent basic service set (IBSS) receives a Channel Switch Mode field that has the value 1, the non-DMG STA does not transmit any more frames on the channel until the scheduled channel switch occurs.

Figure 3:
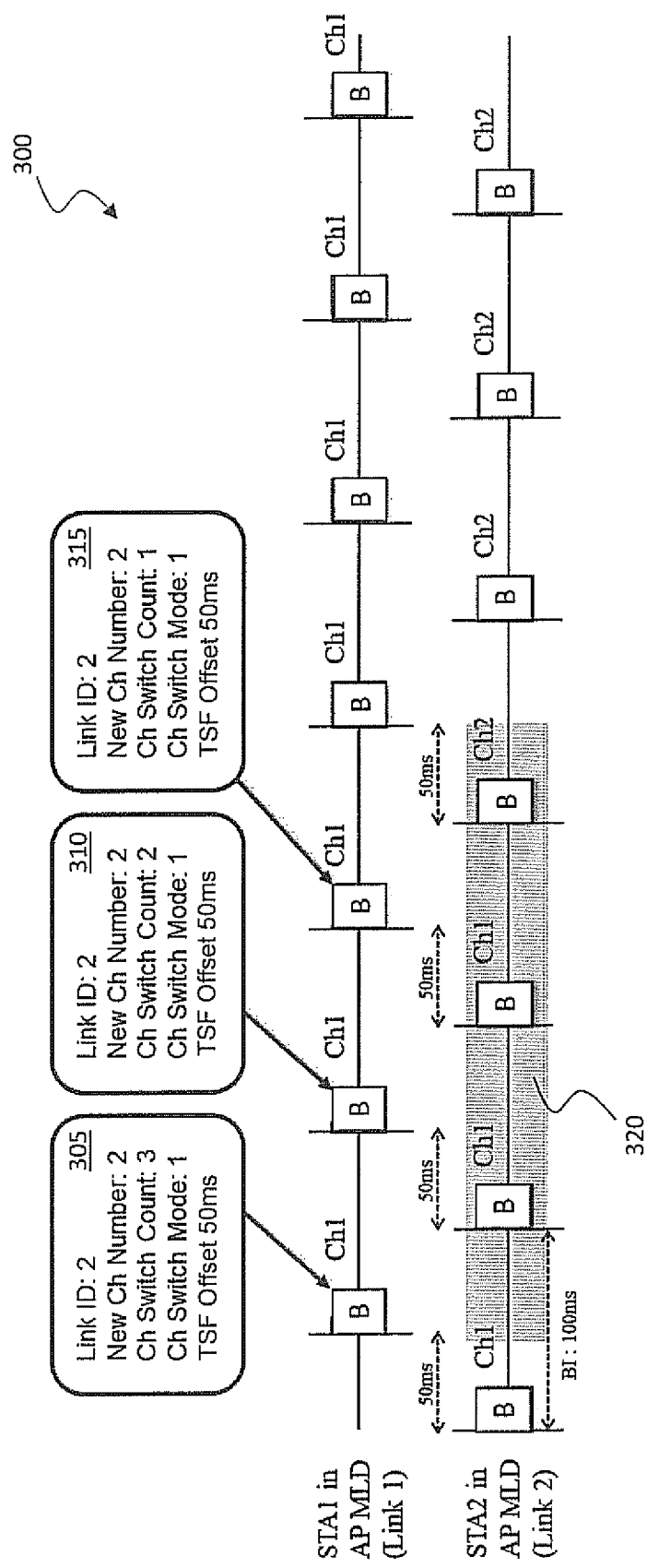
FIG. 3 is a transmission timing diagram depicting exemplary wireless transmissions of a non-AP MLD monitoring Link 1 for a BSS parameter update, where the non-AP MLD stops transmitting on Link 2 after receiving ECSA information announcing the BSS parameter update according to embodiments of the present invention.

As depicted in exemplary wireless transmission 300 of FIG. 3, according to some embodiments of the present invention, a non-AP MLD monitoring Link 1 for BSS parameter updates stops transmitting on Link 2 after receiving the ECSA information having the Channel Switch Mode set to 1 until the Channel Switch Count is set to 0 (time period 320). Beacon frame 315 broadcast by STA1 310 over Channel 1 includes a Multi-link IE indicating: Link ID=Link 2; new channel number=Channel 2; Channel switch count=3; and Channel switch mode=1. The non-AP MLD only monitors Link 1 for the BSS parameter update and stops transmitting on Link 2 after receiving the ECSA information having the Channel Switch Mode set to 1 until the Channel Switch Count is set to 0.

Figure 4:
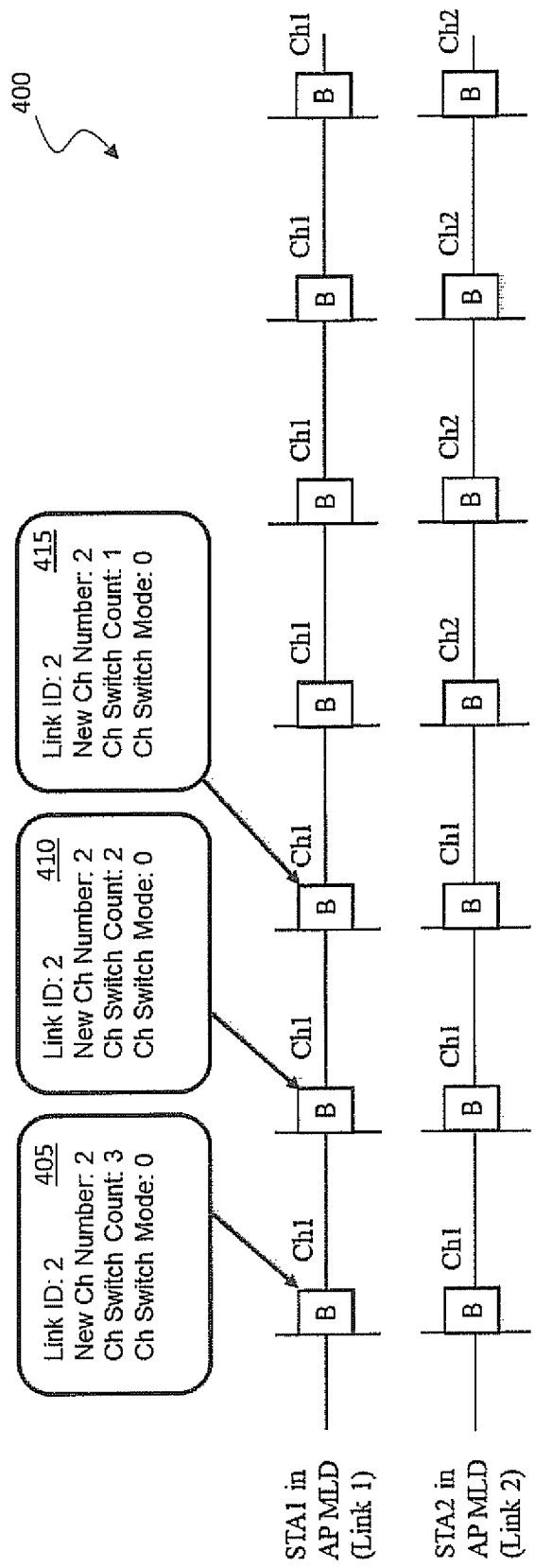
FIG. 4 is a transmission timing diagram depicting an exemplary wireless transmission for performing a multi-link BSS parameter update for aligned TBTTs according to embodiments of the present invention.

FIG. 4 depicts an exemplary wireless transmission 400 for performing a multi-link BSS parameter update for aligned TBTTs according to embodiments of the present invention. STA1 and STA2 of an AP MLD have negligible TSF differences and therefore the optional subelements field in the Multi-link IE can contain only the ECSA IE without any TSF Offset information. In the example of FIG. 4, beacon frame 405 broadcast by STA1 over Channel 1 includes a multi-link IE indicating: Link ID=Link 2, new channel number=Channel 2, Channel switch count=3, and Channel switch mode=0. Beacon frame 410 is subsequently broadcast on Link 1 by STA1 of the MLD AP and includes a decremented Channel switch count (Channel switch count=2). The final beacon frame 415 transmitted before the channel switch is broadcast on Link 1 by STA1 of the MLD AP and include a decremented Channel switch count (Channel switch count=1). The Channel Switch Mode field in the ECSA IE can be set to either 0 or 1 in the beacon frames. The ECSA IE can optionally include a TSF Offset field set to 0.

According to other embodiments, multi-link parameter updates can be communicated to wireless STAs using a BSS Color Change Announcement (BCCA) carried in an optional subelements field of a multi-link IE, for example, Multi-link IE 100 depicted in FIG. 1. The optional subelements field in the Multi-link IE (e.g., optional subelements field 105) may contain the beacon interval (BI) and the TSF offset between two wireless links in order to track the TBTT. Importantly, when the BI and the TSF offset are not present in the Multi-link IE, the BSS color is disabled until the BSS color change indicated by the BCCA takes place.

According to some embodiments, an STA ("STA1") within an AP MLD can send a Change Sequence IE to indicate a change of system information within a BSS associated with another STA ("STA2") within the AP MLD. The Change Sequence IE can be carried in an optional subelements field of a Multi-link IE as depicted in FIG. 1, for example. The Change Sequence field in the Multi-link Change Sequence IE is defined as an unsigned integer (initialized to 0) that increments when a critical update occurs to any of the elements inside a Beacon frame sent on the link indicated by the Link ID associated with another STA (e.g., STA2) within an AP MLD. STA1 within the AP MLD increases the value (modulo 256) of the Change Sequence field in the next Beacon frame(s) transmitted to indicate a critical update of any of the elements inside the Beacon frame sent on the link indicated by the Link ID associated with another STA (e.g., STA2) within the AP MLD. If an STA of an AP MLD transmits a BSSID in a multiple BSSID set, the AP MLD includes a Change Sequence field in the Beacon and Probe Response frames for each non-transmitted BSSIDs in the same multiple BSSID set. The Change Sequence field for other STAs of the AP MLD can be carried in an MLD Parameters subfield in a Reduced Neighbor Report element corresponding to that STA.

The critical updates indicated by the change sequence field can include, but are not limited to, an Extended Channel Switch Announcement, a BSS Color Change Announcement, a modification of Enhanced Distributed Channel Access (EDCA) parameters, a modification of an MU EDCA Parameter Set element, and a modification of the Spatial Reuse Parameter Set element. The STA within the AP MLD transmitting the Change Sequence can also classify other changes in the Beacon frame as critical updates as desired.

According to some embodiments, when an STA of a non-AP MLD is in power saving mode ("doze") and an AP MLD has data to be transmitted to the STA, the AP can indicate that it has buffered data for a DL operation to the STA using a different wireless link associated with the non-AP MLD. When an STA ("STA1") of a non-AP MLD receives a Change Sequence field that contains a value that is different from the previously received Change Sequence field, another STA ("STA2") of the non-AP MLD must be awake to receive the next beacon frame transmitted on the link indicated in the Link ID field, or must queue a Probe Request frame for transmission to a STA within the AP MLD. That Probe Request frame can be transmitted to either STA1 within the AP MLD or the STA2 within the AP MLD. After receiving the corresponding Probe Request frame, the AP MLD provides the updated BSS parameter information by sending the Probe Response frame. The non-AP MLD stores a record of the most recently received Change Sequence field value for each STA of the AP MLD with which it has established multi-link communication. After waking, the non-AP MLD receives the next beacon frame transmitted on the link indicated in the Link ID field and configures operations on the link accordingly.

Figure 5:
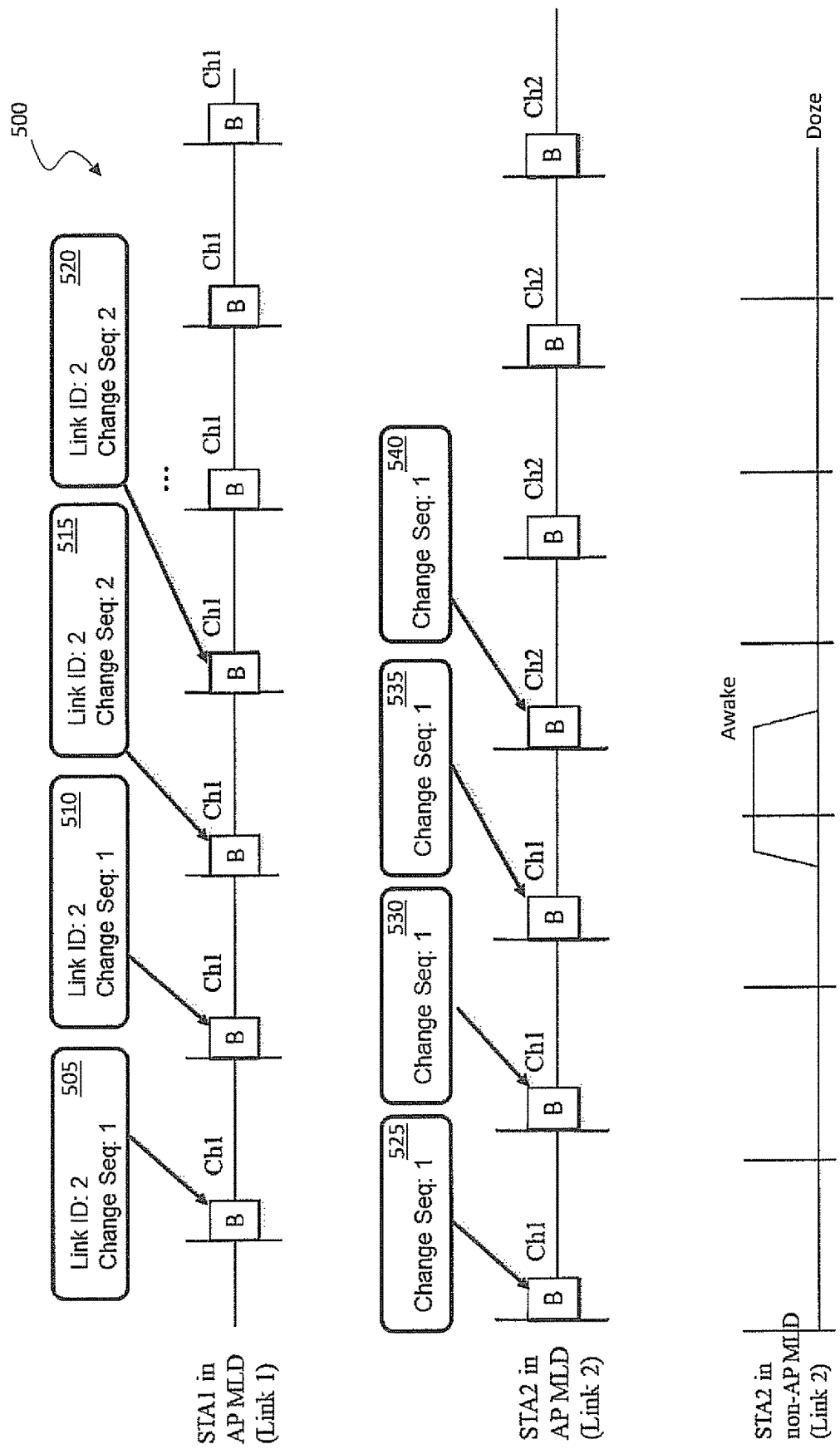
FIG. 5 is a transmission and timing diagram depicting an AP MLD including STA1 operating on wireless Link1 and STA2 operating on wireless Link 2, where STA2 of the AP MLD broadcasts beacon frames on Link2 including a Change Sequence field for announcing a BSS parameter update according to embodiments of the present invention.

Transmission timing diagram 500 of FIG. 5 depicts an AP MLD including STA1 operating on wireless Link1 and STA2 operating on wireless Link 2 according to embodiments of the present invention. STA2 of the AP MLD broadcasts beacon frames 505, 510, 515, and 520 on Link2 including a Change Sequence field. The value of the Change Sequence field in beacon frame 520 is different than the value of the Change Sequence fields in the preceding beacon frames 505, 510, and 515, thereby indicating a critical update of operating parameters for Link 2. However, as depicted in FIG. 5, STA2 of a non-AP MLD associated with Link 2 is in a doze state (not awake) when beacon frames 505, 510, and 515 are transmitted by STA2 of the AP MLD.

Advantageously, beacon frames 525, 530, 535, and 540 broadcast by STA1 of the AP MLD indicate Link 2 (e.g., using a link identification (ID)) and include a Change Sequence Field. Beacon frames 525 and 530 include a Change Sequence Field having a value of 1. The value of the Change Sequence field carried in Beacon frame 535 is incremented (Change Sequence field=2), thereby indicating a critical update of operating parameters for the link identified by the Link ID field (Link 2). STA1 of the non-AP MLD (not pictured) receives beacon frames 525, 530, 535, and 540 broadcast by STA1 of the AP MLD and causes STA2 of the non-AP MLD to enter an "awake" state so that beacon frames (e.g., beacon frames 535 and 540) can be received by STA2 of the non-AP MLD. In this way, the critical update for the BSS parameters is received by STA2 of the non-AP MLD while STA2 is awake, and STA2 of the non-AP MLD can communicate with STA2 of the AP MLD using the updated operating parameters. Alternatively, when STA2 of the non-AP MLD wakes, it can transmit a probe request frame to STA2 of the AP MLD to receive the critical update.

According to some embodiments, an STA within an AP MLD may send management frames related to BSS parameters of a different STA within the AP MLD, for example, using an On-channel Tunnel (OCT) Request frame. The On-channel Tunnel Request frame allows an STA of a multi-band device to encapsulate a MAC Management Protocol Data Unit (MMPDU) for transmission to a MAC Sublayer Management Entity (MLME) of a peer STA within the same multi-band device. In this case, a Multi-band element of an OCT Request frame can be replaced by another element dedicated to the multi-link operation (e.g., Multi-link element).

Figure 6:
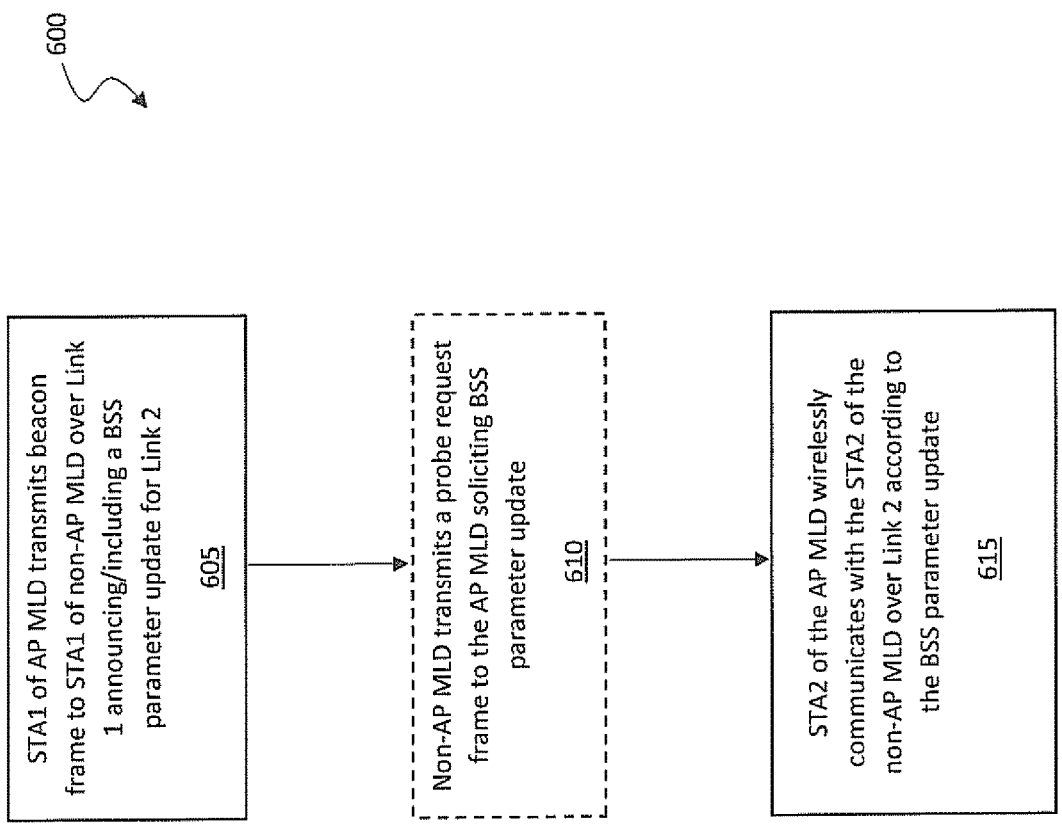
FIG. 6 is a flow chart of an exemplary computer implemented process for transmitting/announcing a BSS parameter update for a MLD according to embodiments of the present invention.

FIG. 6 depicts an exemplary sequence of computer-implemented steps of a process 600 for transmitting BSS parameter updates over a first wireless link to update the BSS parameters of a second wireless link of a multi-link device according to embodiments of the present invention. In the flow chart of FIG. 6, an AP MLD and a non-AP MLD communicate wirelessly over the first and second wireless link.

At step 605, a beacon frame is wirelessly transmitted to a first STA of the non-AP MLD over the first wireless link of the wireless network by a first STA of the AP MLD. The beacon frame identifies the second wireless link (e.g., using a Link ID) and announces and/or includes a basic service set (BSS) parameter update for the second wireless link. The Link ID and BSS parameter update can be carried in ECSA (e.g., in an optional subelements field) Multi-link IE. The ECSA Multi-link IE can include a channel number, a channel switch count, a channel switch mode, and/or a change sequence, for example, used to indicate a channel switch or other BSS parameter update (e.g., BSS Color Change Announcement, modification of EDCA parameters, modification of MU EDCA Parameter Set element, modification of the Spatial Reuse Parameter Set element, etc.). According to some embodiments, at step 605, a management frame is transmitted instead of a beacon frame. The management frame can be carried in an OCT Request frame, for example.

At step 610, if the beacon frame transmitted in step 605 indicates that a BSS parameter update for the second wireless link is available but does not include the BSS parameter update, the non-AP MLD can optionally transmit a probe request frame to the AP MLD to receive the update.

At step 615, the second STA of the AP MLD wirelessly communicates with the second STA of the non-AP MLD over the second wireless link according to the BSS parameter update.

Figure 7:
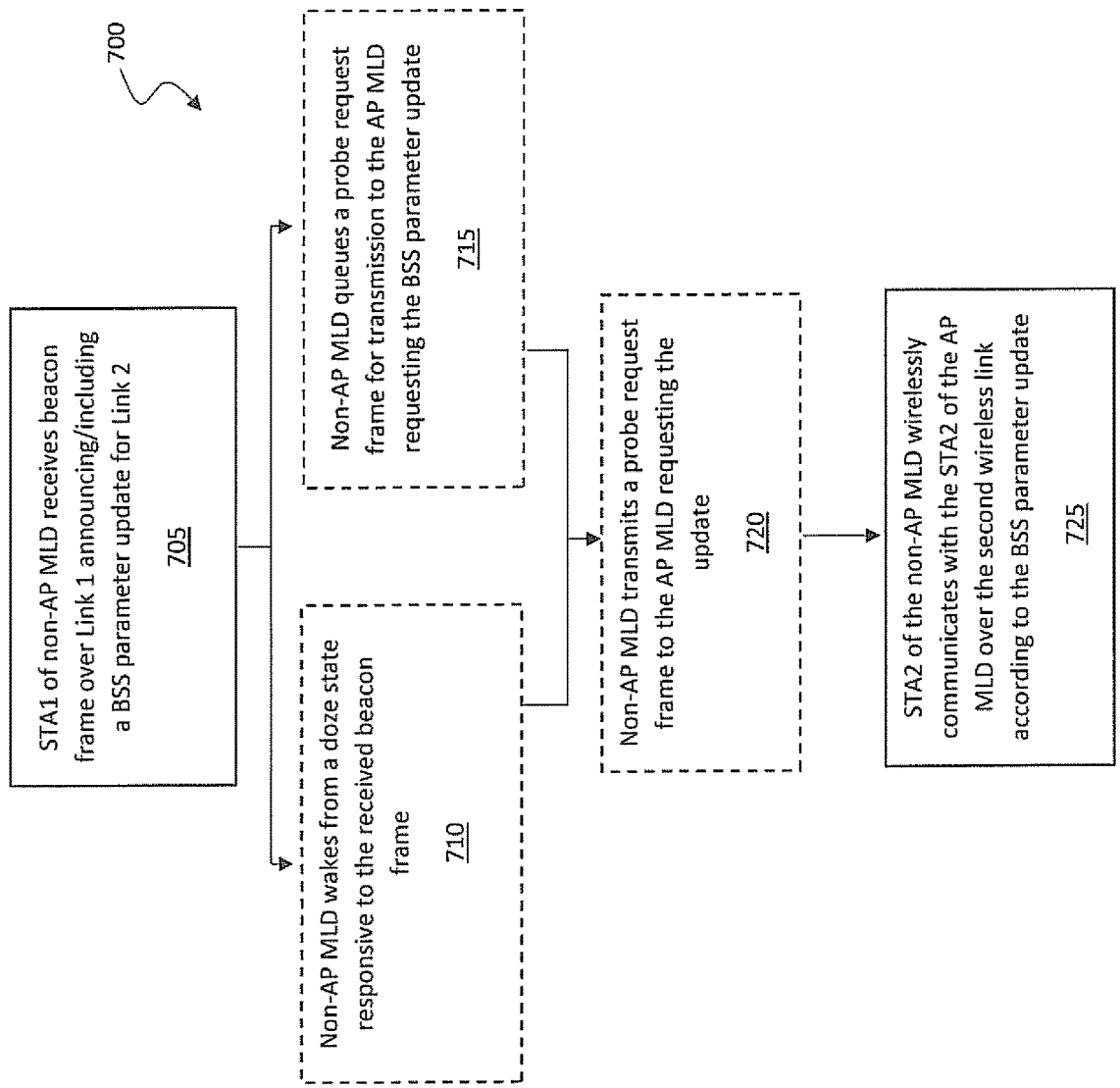
FIG. 7 is a flow chart of an exemplary computer implemented process for receiving a BSS parameter update at a MLD according to embodiments of the present invention.

FIG. 7 depicts an exemplary sequence of computer-implemented steps of a process 700 for receiving BSS parameter updates over a first wireless link to update the BSS parameters of a second wireless link of a multi-link device according to embodiments of the present invention. In the flow chart of FIG. 7, an AP MLD and a non-AP MLD communicate wirelessly over the first and second wireless link.

At step 705, a beacon frame is received by a first STA of the non-AP MLD over the first wireless link of the wireless network from a first STA of the AP MLD. The beacon frame identifies the second wireless link (e.g., using a Link ID) and announces and/or includes a BSS parameter update for the second wireless link. The Link ID and BSS parameter update can be carried in ECSA (e.g., in an optional subelements field) Multi-link IE. The ECSA Multi-link IE can include a channel number, a channel switch count, a channel switch mode, and/or a change sequence, for example, used to indicate a channel switch or other BSS parameter update (e.g., BSS Color Change Announcement, modification of EDCA parameters, modification of MU EDCA Parameter Set element, modification of the Spatial Reuse Parameter Set element, etc.). According to some embodiments, at step 705, a management frame is received instead of a beacon frame. The management frame can be carried in an OCT Request frame, for example.

At step 710, the non-AP MLD optionally wakes from a doze state to receive a beacon frame comprising a BSS parameter update which is responsive to the beacon frame received in step 705; alternatively, at step 715, the non-AP MLD optionally queues a probe request frame for transmission to the AP MLD requesting the BSS parameter update.

At step 720, if the beacon frame transmitted in step 705 indicates that a basic service set (BSS) parameter update for the second wireless link is available but does not explicitly include the BSS parameter update, the non-AP MLD can transmit a probe request frame to the AP MLD requesting the update.

At step 725, the second STA of the non-AP MLD wirelessly communicates with the second STA of the AP MLD over the second wireless link according to the BSS parameter update.

EXEMPLARY COMPUTER CONTROLLED SYSTEM

Figure 8:
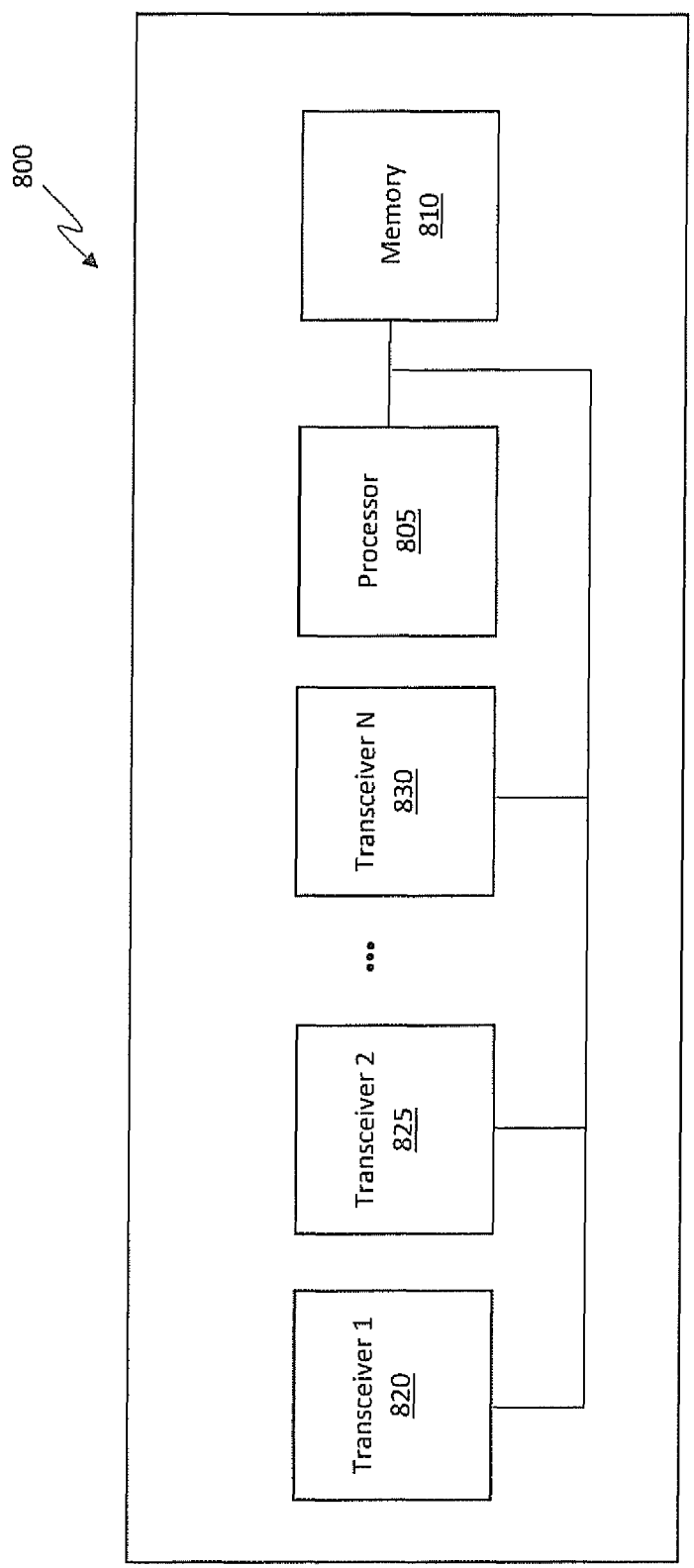
FIG. 8 is a block diagram depicting an exemplary computer system platform upon which embodiments of the present invention may be implemented

FIG. 8 depicts an exemplary wireless device 800 upon which embodiments of the present invention can be implemented. Embodiments of the present invention are drawn to electronic systems capable of communicating over multiple wireless links (e.g., using multi-link operations) in a wireless network. The wireless device 800 is an MLD, such as an AP MLD or a non-AP MLD, comprising multiple wireless stations. The system can broadcast and/or receive a BSS parameter update for a wireless link that can be received by a MLD even when the MLD is not listening for parameter updates on that specific link by employing a different wireless link to broadcast, receive, and/or signal the BSS parameter update. An associated MLD can update the BSS parameters of the wireless link and use the wireless link according to the updated BSS parameters (e.g., after performing a channel switch). According to some embodiments, an STA within an AP MLD transmits an IE including BSS parameter updates associated with a different STA (operating on a different wireless link) within the AP MLD for receipt by a non-AP MLD. The non-AP MLD can continue to communicate with the AP MLD using the updated BSS parameters.

The wireless device 800 includes a processor 805 for running software applications and optionally an operating system. Memory 810 can include read-only memory and/or random access memory, for example, to store applications and data for use by the processor 805 and data received or transmitted by transceivers 820, 825, and 830. The wireless device 800 can include fewer or more transceivers according to some embodiments. The transceivers 820, 825, 830 communicate with other electronic devices over a wireless network (e.g., WLAN) and typically operates according to IEEE standards (e.g., IEEE 802.11ax, IEEE 802.11ay, IEEE 802.11be, etc.).

Embodiments of the present invention are thus described. While the present invention has been described in particular embodiments, it should be appreciated that the present invention should not be construed as limited by such embodiments, but rather construed according to the following claims.

What is claimed is:

1. A method of transmitting data over a wireless network, the method comprising:
   at a first wireless station (STA) of an access point (AP) multi-link device (MLD), wirelessly transmitting a beacon frame to a first STA of a non-AP MLD over a first wireless link of the wireless network, wherein a second wireless link of the wireless network carries communication between a second STA of the non-AP MLD and a second STA of the AP MLD, and wherein the beacon frame comprises: a first change sequence field associated with the first wireless link; and a second change sequence field associated with the second wireless link, wherein the first change sequence field or the second change sequence field is incremented when a critical update occurs to operational parameters of the respective wireless link; and
   at the second STA of the AP MLD, wirelessly communicating with the second STA of the non-AP MLD over the second wireless link according to the critical update.

2. The method as described in claim 1, wherein the BSS parameter update is carried in an Extended Channel Switch Announcement (ECSA) information element (IE) of a multi-link information IE.

3. The method as described in claim 1, wherein the BSS parameter update comprises: a beacon interval; and a timing synchronization function (TSF) offset between the first wireless link and the second wireless link for performing a channel switch on the second wireless link.

4. The method as described in claim 1, wherein the BSS parameter update comprises: a new channel number; and a channel switch count for performing a channel switch on the second wireless link.

5. The method as described in claim 1, wherein the second STA of the non-AP MLD is operable to pause a transmission over the second wireless link until a beacon frame comprising an Extended Channel Switch Announcement (ECSA) information element (IE) having a Channel Switch Count set to 0 is received by the second STA of the non-AP MLD.

6. The method as described in claim 1, wherein the BSS parameter update comprises a BSS color change, and further comprising disabling a BSS color of the wireless network until the BSS color change is complete.

7. The method as described in claim 1, wherein the BSS parameter update comprises a change sequence number, wherein a change in a value of the change sequence number indicates a critical update for the second wireless link.

8. The method as described in claim 7, wherein the critical update comprises at least one of: an Extended Channel Switch Announcement (ECSA); a BSS Color Change Announcement; an EDCA (Enhanced Distributed Channel Access) parameter modification; a multi-user (MU) EDCA Parameter Set element; and a Modification of a Spatial Reuse Parameter Set element.

9. The method as described in claim 1, wherein the BSS parameter update comprises a change sequence number, wherein a change in a value of the change sequence number causes the second STA of the non-MLD to enter an awake state.

10. A method of transmitting data over a wireless network, the method comprising:
    at a first wireless station (STA) of an non-access point (AP) multi-link device (MLD), accessing a beacon frame transmitted by a first STA of an AP MLD, wherein the first STA of the non-AP MLD and first STA of the AP MLD communicate wirelessly over a first wireless link, wherein a second wireless link carries communication between a second STA of the non-AP MLD and a second STA of the AP MLD, and wherein the beacon frame comprises: a first change sequence field associated with the first wireless link; and a second change sequence field associated with the second wireless link, wherein the first change sequence field or the second change sequence field is incremented when a critical update occurs to operational parameters of the respective wireless link; and
    at the second STA of the non-AP MLD, wirelessly communicating with the second STA of the AP MLD over the second wireless link according to the critical update.

11. The method as described in claim 10, wherein the BSS parameter update is carried in an Extended Channel Switch Announcement (ECSA) information element (IE) of a multi-link information IE.

12. The method as described in claim 10, wherein the BSS parameter update comprises: a beacon interval; and a timing synchronization function (TSF) offset between the first wireless link and the second wireless link for performing a channel switch on the second wireless link.

13. The method as described in claim 10, wherein the BSS parameter update comprises: a new channel number; and a channel switch count for performing a channel switch on the second wireless link.

14. The method as described in claim 10, wherein the second STA of the non-AP MLD is operable to pause a transmission over the second wireless link until a beacon frame comprising an Extended Channel Switch Announcement (ECSA) information element (IE) having a Channel Switch Count set to 0 is received by the second STA of the non-AP MLD.

15. The method as described in claim 10, wherein the BSS parameter update comprises a BSS color change, and further comprising disabling a BSS color of the wireless network until the BSS color change is complete.

16. The method as described in claim 10, wherein the BSS parameter update comprises a change sequence number, wherein a change in a value of the change sequence number indicates a critical update for the second wireless link.

17. The method as described in claim 16, wherein the critical update comprises at least one of: an Extended Channel Switch Announcement (ECSA); a BSS Color Change Announcement; an EDCA parameter modification; a multi-user (MU) EDCA Parameter Set element; and a Modification of a Spatial Reuse Parameter Set element.

18. The method as described in claim 10, wherein the BSS parameter update comprises a change sequence number, wherein a change in a value of the change sequence number causes the second STA of the non-MLD to enter an awake state.

19. An access point (AP) multi-link device (MLD) for transmitting data over a wireless network, the apparatus comprising:
    a first transceiver and a second transceiver configured to send and receive data over the wireless network;
    a memory for storing data; and
    a processor operable to:
      wirelessly transmit a beacon frame to a first STA of a non-AP MLD over a first wireless link of the wireless network using the first transceiver, wherein a second STA of the non-AP MLD and a second STA of the AP MLD communicate wirelessly over a second wireless link of the wireless network using the second transceiver, and wherein the beacon frame comprises: a first change sequence field associated with the first wireless link; and a second change sequence field associated with the second wireless link, wherein the first change sequence field or the second change sequence field is incremented when a critical update occurs to operational parameters of the respective wireless link; and wirelessly communicate with the second STA of the non-AP MLD over the second wireless link using the second transceiver according to the critical update.

20. The apparatus as described in claim 19, wherein the BSS parameter update is carried in a management frame.

* * * * *